United States Patent [19]

Pühringer

[11] Patent Number: 4,937,104

[45] Date of Patent: Jun. 26, 1990

[54] PROCESS FOR IMPARTING HYDROPHOBICITY TO MINERAL SUBSTRATES

[75] Inventor: Josef A. Pühringer, Stockholm-Täby, Sweden

[73] Assignee: Huels Aktiengesellschaft, Marl, Fed. Rep. of Germany

[21] Appl. No.: 684,980

[22] Filed: Dec. 21, 1984

Related U.S. Application Data

[60] Continuation of Ser. No. 507,613, Aug. 5, 1983, abandoned, which is a division of Ser. No. 271,098, Jun. 8, 1981, Pat. No. 4,433,013, which is a continuation of Ser. No. 39,581, May 31, 1979, abandoned.

[51] Int. Cl.$^5$ ............................................. B05D 3/10
[52] U.S. Cl. .................................... 427/344; 427/337
[58] Field of Search ............... 427/337, 343, 344, 399; 428/447, 540

[56] References Cited

U.S. PATENT DOCUMENTS

| | | | |
|---|---|---|---|
| 2,982,674 | 5/1961 | Ganeburg | 428/447 |
| 3,424,598 | 1/1969 | Snyder et al. | 428/447 |
| 3,563,786 | 2/1971 | Tse et al. | 427/337 |
| 3,772,065 | 11/1973 | Seiler | 427/299 |
| 3,849,357 | 11/1974 | Wolf | 428/447 |
| 4,002,800 | 1/1977 | Nestler et al. | 428/447 |
| 4,137,367 | 1/1979 | Sample et al. | 428/447 |

FOREIGN PATENT DOCUMENTS 1502322 3/1978 United Kingdom .

OTHER PUBLICATIONS

Schwartz et al. *Surface Active Agents*, Interscience Publ., N.Y., 1949, pg. 204, Tp 149 S4Cop4.

*Primary Examiner*—Janyce Bell
*Attorney, Agent, or Firm*—Felfe & Lynch

[57] ABSTRACT

Disclosed is a process for imparting hydrophobicity to an inorganic porous mineral substrate which comprises mixing at least one silane and/or hydrolysis and/or condensation product thereof, at least deactivatable surfactant and water or a water/organic alcohol mixture to form a dispersion emulsion, applying the resulting dispersion or emulsion to the substrate, and, if necessary, subsequently treating the substrate in order to deactivate the surfactant.

3 Claims, No Drawings

PROCESS FOR IMPARTING HYDROPHOBICITY TO MINERAL SUBSTRATES

This application is a continuation, of application Ser. No. 507,613, filed Aug. 5, 1983 now abandoned, which is a divisional of application Ser. No. 271,098, filed June 8, 1981, issued to U.S. Pat. No. 4,433,013, which is a continuation of application Ser. No. 039,581, filed May 31, 1979 now abandoned.

The invention is concerned with a process for imparting water-repellancy or at least hydrophobicity to mineral substrates such as porous building materials particularly alkaline mineral building materials.

It is known to impart hydrophobia to building surface layers, ultimately to make them water-repellent. The purpose of this treatment is mainly to prevent rain water from penetrating the surface layer of buildings and their pore and capillary systems and thereby introducing harmful sustances, such as sulphuric acid and carbonic acid dissolved in the rain water, to prevent introduction of salt water either arising from the salting of nearby roads or from fog in marine areas and to prevent introduction of chlorides or freezing shocks. Furthermore, aesthetic damage arises when dirt from the combustion of fuels and from street dust is absorbed into the outermost layer of the buildings. The prevention of damage in the surface layer of porous materials can be attained in several ways by mixing certain surface active agents, stearates of silicones i.e. substances having a certain interphase angle of contact towards water, either in the manufacture of the constituents of the porous material or by treating the final construction with such preparations, usually in solution or emulsion. When applying such preparations the surface active compositions are usually dissolved in organic solvents which in themselves sooner or later are toxic. Useful emulsions are often such solutions dispersed in water. In my attempts to develop water-repellants not containing deleterious organic solvents I have considered silanes in solution in alcohol or water. One method of using silanes of a particular type is described in U.S. Pat. No. 3,772,065 the impregnating agent being an alkyl trialkoxy-silane or a condensation product thereof having 0-2 alkoxy groups per silicon atom and wherein the alkoxy residue of the alkyl trialkoxy-silane is a methoxy or ethoxy residue and the alkyl residue of the alkyl trialkoxy-silane has 1-6 carbon atoms. In this Patent there are described the differences and advantages of silanes dissolved in alcohol (and those for medical-professional reasons dissolved in ethylene) as compared to conventional water repellants. These silanes are largely neutral. An advantage in using silanes is their high alkali resistance. Comparative tests have shown that the high rate of degradation of silicons applied in the form of solutions in alkaline environment is not present when using certain silanes.

It has also been found that, even if silanes are not so effective when used in an alkaline environment, for example in fresh mortars, their effectiveness recovers when the alkalinity is reduced, for example under carbonation. This makes it possible to use silanes in the preparation of building materials which are strongly alkaline during their manufacture.

Emulsions can, of course, be prepared from solutions of silanes in organic solvents. Penetration of such emulsions into mineral building materials is in many cases limited by low affinity between organic solvents and inorganic materials. This is emphasized in certain cases also by the large particle size in emulsions. Emulsions formed directly with hydolyzed silanes in water or water/alcohol mixtures as an emulsifying liquid do not possess these disadvantages. In these emulsions, solvents deleterious to health are not present. The absence of such organic solvents also allows better penetration into mineral building materials. To these advantages there is added the advantage, as compared to conventional aqueous or alcohol solvents, that the material can "breathe" in a more efficient manner (high wet diffusion). A composition and process for the preparation of an impregnated building material is disclosed in U.K. Patent Specification No. 1502322 from which it is clear that agents for imparting hydrophobia to building materials may be prepared directly from certain silanes or solutions of silanes in alcohol and water by mechanical dispersion. In this case useful dilutions can be made down to 1% dilution of silane in water.

In the experiments carried out it was found that the effective penetration depth on treatment of porous materials increases with increasing concentration of alcohol in the water/alcohol emulsifying vehicle. It was also found that the emulsion tends to break with increasing water content. Mechanical emulsification had to be repeated at the impregnation stage or the amount of emulsion prepared had to be maintained within ranges adapted to the purpose and manner of treatment. This indicates lowered particle size in the emulsion at increased alcohol content. At certain alcohol contents (about 50% and higher in the emulsifying vehicle) it has not been possible to obtain emulsions. The ability of an impregnated mineral porous building material to withstand higher water pressures for a longer period of time is—when using organosilicon compounds dependent on the amount of effective hydrophobic agent applied; even if under alkaline influence there is some decomposition, some active material will still remain, if a controlled amount of hydrophobic agent is chosen. In application onto facades this amount is a few percent. The effect may be maintained for up to 10 years and is not exclusively dependent on decomposition caused by alkalis but also from, for example, UV-light influence mostly from sunshine. If only short-term effects are desired these could still be provided using lower amounts of surface active water-repellant agent in the solvent. One could also apply smaller amounts of highly-concentrated agent per unit of treated surface. At the same expense this means a lower penetration depth or, in extreme cases, only surface treatment. The resulting products are very sensitive to mechanical attack and may therefore only exceptionally, in view of the thinness of the hydrophobic layer resist water under pressure, even under moderate pressure. Exceptions to this are certain silanes, for example those silanes described in the Swedish Patent Specification No. 367616. When such silanes are applied in small amounts in liquid form so that momentary penetration of the impregnant liquid to a very small depth can be observed, hydrophobic effects over up to a few millimeters can be obtained over a longer period of time and under at certain storage conditions, for example a few months, (probably in view of gas formation) and this only in very porous materials.

Within the building industry it is sometimes desired to protect mineral building materials temporarily against moisture penetration, usually rain and snow and for this only relatively low concentrations of hydrophobating agent are necessary. The need for protection arises under storage conditions immediately after manufacture, under transportation and under assembly and, of course, in the building under use. This is the case for example with products of light-weight concrete, asbestos and bricks of varying types, for example those manufactured from fired clay and lime sand stone. Also some natural stones and, of course, also concrete products may need protection. The protecting agent may be applied in the factory or in more or less closed places so that environmental considerations are important when preparing the water-repellant and also when applying it. For example contact between the repellant, if it contains hazardous constituents, and personnel should be avoided. In view of the large surfaces to be treated the repellant and the process for its application must be economic. The treatment should be able to be reinforced, repeated and supplemented. The treatment should not prevent subsequent treatment of the surface layer. It is previously known to pretreat absorbing substrates of building materials, for example, lightweight concrete and gypsum, with hydrophobic agents in order to improve the effect of subsequent treatments with different types of dyes and for example aqueous latex paints. Although in the latter case if the hydrophobic effect should be adapted for the purpose, it may be necessary to add surface-active agents to the paint.

It is also known that reasonably economic hydrophobes are aqueous solutions of siliconates, above all methyl siliconates; but for reaction reasons relatively large amounts of sodium or potassium hydroxide must be added to these aqueous solutions, which contribute to the environmental hazards. The solutions have a pH exceeding 13.

A disadvantage of using these siliconate solutions is the fact that they have only a limited alkali resistance. For this reason siliconate solutions have been developed using propyl siliconates having a higher alkali resistance, but the above-described environmental hazards are still there. A further disadvantage of the latter type of preparation is that they must be admixed in aqueous-alcohol solutions at higher concentrations. It is an advantage of these treatments that they improve the adhesion between mineral substrates and organic coatings, whether paints of various types based on solvents, or disperse paints, or asphalt, by protective treatment for moisture or as binder layers between substrate and paper coating. At low concentrations of hydrophobic agent the choice of solvent or emulsifying vehicle controls the economics for normal penetration depths. It is normal to try and use water as a vehicle for the active substance. The purpose of this invention is to provide an alkali-resistant hydrophobic mineral composition particularly for porous building materials and which is fairly stable and environmentally non-hazardous, effective and simple to apply. The composition of the invention is made economic by the use of silanes with water or a water-alcohol mixture as an emulsifying vehicle so that water predominates in the mixture. The environmental objectives are obtained by avoiding the use of hazardous or poisonous solvents (in solutions or emulsions) and preferably by using a particular type of silane, namely alkyl trialkoxy silane which has been confirmed only in large concentrations to be slightly irritating to skin and eyes. At the concentrations used in imparting hydrophobicity in the systems of the invention this small hazard has been significantly reduced.

The practical operational advantages of the invention make it possible to use operating routines and handling of the constituents of the compositions without great knowledge or use of protective equipment or apparatus. Mixing is possible immediately before the application, possibly in a specially manufactured mixing nozzle or may be performed a reasonable period of time before application since mixtures of the invention can be made possessing suitable storage stability.

Penetration depths not substantially different from those from treatment with solutions, particularly aqueous solutions of active agents may also be achieved. Alkali resistance is also taken into consideration by the use of silanes or hydrolysis products thereof and possibly also their condensation products (silozanes).

It is known that emulsions with silanes and their hydrolysis products directly in water or water-alcohol mixtures can be provided by mechanical emulsification, certain technical advantages being increased by highly efficient machine emulsification and being reduced with increasing amounts of water in the emulsifying vehicle. I have surprisingly found that emulsion stability and reduced particle size, can be obtained by adding surface active substances to the emulsifying vehicle in this case water or water-alcohol mixtures. However, it has also been found that the hydrophobic effect of these emulsions is decreased or disappears wholly on addition of such surface active agents. However, it has been surprisingly found that the advantages of using such additives may be obtained without the concomitant disadvantages if there are used deactivatable surfactants i.e. surfactants which lose, or can be made to lose, their surface active characteristics, in the manufacture of the impregnant or in its application. So in my invention I select surfactants which can be decomposed and lose their surface active characteristics either as a result of an inherent characteristic of the surfactant or as a result of reaction with other materials likely to be present during manufacture of a hydrophobic surface layer in an inorganic mineral substrate or by a reaction which can be initiated after the impregnation of the mineral substrate, during or after its manufacture with this impregnating agent containing the silane and/or hydrolysis and/or condensation product thereof.

This invention also makes it possible to avoid using a highly effective mechanical emulsification of the constituents of the emulsion since mixtures can be made which are emulsifiable by technically less demanding measures, for example simple stirring or direct admixture in conduits in or outside special nozzles. The emulsions of my invention can be applied and possibly also be mixable, by conventional and non-conventional methods of application, for example painting with a brush or rolling, spraying or treatment in spray boxes or otherwise in lines or apparatus adapted to the production process.

The invention provides a process for imparting hydrophobicity to an inorganic porous mineral substrate which comprises mixing at least one silane and/or hydrolysis and/or condensation product thereof, at least one deactivatable surfactant and water or a water/organic alcohol mixture to form a dispersion or emulsion, applying the resulting dispersion or emulsion to the substrate and, if necessary, subsequently treating the substrate in order to deactivate the surfactant.

The preferred hydrophobic agents are water insoluable alkyl trialkoxysilanes described in U.S. Pat. No. 3,772,065 and hydrolysis and condensation products thereof. Useful surfactants include esters of various compositions, for example fatty acid esters or silica esters and particularly alcohol/alkylene oxide adducts. Other surfactants which are unstable in contact with alkali, acid, oxidising or reducing agents in that they readily lose their surface active properties are suitable for use in the invention.

It is admittedly known to use highly concentrated solutions of silica esters in alcohol to reinforce, for example decomposed building constructions, the idea being that the silica ester hydrolyses in view of the water content of the material and then after condensation form silicones. To such solutions there are added alkyl trialkoxysilanes to impart hydrophobicity to the treated and reinforced building material. It is a characteristic of this process that penetration of the active constituents takes place in the form of solution and hydrolysis of the silane takes place in the pore and capillary system of the building construction. This is contrary to the teaching of this invention, wherein, preferably low-concentration, silane emulsions in alcohol/water or water are used, the hydrolysis taking place before the application to the substrate and the amount of silica esters remains extremely small in relation to the amount of silane.

The mixing may be carried out in any convenient manner or order; the silane and possibly also the surfactant may for example be dissolved in alcohol and emulsified in water. The mixing with water will result in the formation of hydrolysis and condensation products in the water or water/alcohol vehicle. It is also possible to emulsify silanes and their hydrolysis and condensation products or solutions thereof in organic solvents in water by adding the above-identified surfactants. The decomposition of the surfactants to non-surface-active substances then takes place either in cooperation and reaction with the constituents of the treated material or after application (impregnation) of the substrate with a decomposing component in a subsequent treatment step. If surfactants having low resistance to alkali, acids, oxidative agents or reducing agents are used, this reaction may be effected with said substances being, or being dissolved in, liquids (for example water) or being mixed with, gases (for example air).

It is a surprising finding in relation to this invention that the emulsions containing silane and or hydrolysis and/or condensation products thereof in water or water/alcohol mixtures can be prepared with extremely high as well as extremely low contents of silanes in the emulsion, and this is contrary to the teaching of U.K. Patent Specification No. 1502322.

It has also been surprisingly found that the penetration depth of the emulsions prepared in this manner can be considerably higher than that obtained in the above-identified U.K. Patent Specification in view of the fact that the particle size in the present process using surfactants is considerably smaller than the particle size according to the U.K. Patent Specification.

The relatively small penetration depth when using silane-water emulsions having a high water content and a low alcohol content according to U.K. Patent Specification No. 1502322 also derives from the fact that silanes rather quickly react with lime-containing materials in the pore system making the treated material water-repellent and thereby preventing further absorption of the water-based emulsion. This effect is opposed in the present invention by using surfactants which, in the initial stages, prevent the pore walls of the substrate from obtaining water-repellent characteristics; in this manner a greater penetration depth can be obtained with emulsions containing large amounts of water. The hydrophobic effect will be obtained later after the surface active action of the surfactant has disappeared or considerably decreased, either by reaction with the basic material or by a supplementary impregnation treatment. A further advantage of using this type of hydrophobation is that it can be applied to already hydrophobic surfaces in spite of the fact that the emulsifying vehicle contains considerable amounts of water. The content of surfactants reduces the hydrophobicity of the surface layer temporarily until the action of the surfactant has disappeared, as indicated above.

When preparing emulsions or dispersions in the process of this invention it is possible to use different concentrations of silanes (or their reaction product with water), the emulsions having contents between 1% and up to about 50% depending on the type of silane. The surface active agent can be used in an amount as low as less than 1% of the emulsion by volume, preferably between 0.1 and 1%. As silanes, alkyl trialkoxy silanes taught in U.S. Pat. No. 3,772,065 are preferably used.

Preferred decomposable surfactants include esters and alcohol-alkylene oxide adducts. The water content of alcohol-water mixtures in the emulsifying vehicle may be between 100 and 50%, preferably between 95 and 75%. The compositions are particularly useful in commercially imparting hydrophobicity to for example, light-weight concrete, asbestos products, lime sandstone, concrete roof tiles, and these materials can be treated according to the invention to provide a temporary water-repellent surface under storage, transportation and assembly or give a more permanent treatment. The treatment can also take place in situ of for example mortars, silicates, water glass and bricks of lime sandstone. Also gypsum plates can be made hydrophobic according to the method of the invention.

In most cases the decomposition of the surfactant takes place under the influence of the alkalinity of the building material or reaction with metal oxides or the like during or immediately after the manufacture of the substrate or its assembly. It is therefore preferable to choose, as deactivated surfactant, one which loses its surfactant properties on contact with alkali or oxides normally found in porous organic mineral building materials. It can however also be effected by simultaneous or subsequent impregnation with liquids, particularly water or water-alcohol mixtures, containing alkaline and/or acid substances or containing oxidising or reducing agents or gases constituting or containing and mixed with said substances. What is important therefore is that, in contact with the building material the surface active property will either be lost automatically or can be lost by treatment with another fluid which will not harm the building material.

It has surprisingly been found that emulsions can be prepared according to the invention which have a longer stability period than emulsions prepared according to U.K. Patent Specification No. 1502322.

The treatment process according to the invention, namely treating porous materials, particularly building materials, with the described emulsions or dispersions has the advantage that wet materials, e.g. wet buildings, can be now treated with hydrophobic agents. In all cases silanes, hydrolysate silanes or their reaction products, such as siloxanes, may be used as hydrophobic agent. The evaporation of solvent or dispersing agent, after the hydrophobic agent has reacted with the building material or has become active in another manner is hampered as liquid transportation in the hydrophobic composition cannot take place; only vapour diffusion can occur. Thus the hydrophobicity delays drying out of a wet substrate irrespective of whether the wetting is a result of the process of manufacture, as for example in fresh concrete, mortars, lightweight concrete or lime sandstone, or is the result of a cleaning treatment. The delayed drying may to some extent be eliminated by delaying the hydrophobic effect for example by adding a decomposable surfactant according to the invention. It is true that the surfactant impregnation of a porous material reduces the rate by which contained moisture can evaporate, but this rate can be made higher than in full definitive hydrophobation by suitable choice of surfactant and the amount thereof in the impregnant liquid.

The imparting of hydrophobicity with delayed action by adding decomposable surfactants may also be used starting with solutions of the silane such as solutions of alkyl trialkoxysilanes in alcohol. These are then used in the process of the invention by mixing into emulsions as described herein.

According to the processes of the invention building materials or other materials consisting of or containing constituents capable of reacting with silanes can be hydrophobated. These constituents can be hydroxy-containing groups (for example lime) or metal oxides or may react with silanes in another manner so that a siloxane film can be formed on their surface. Among building materials fulfilling these requirements are concrete, light clinker and light ballast concrete, lightweight concrete, mortars, plaster of Paris and products prepared from gypsum, asbestos cement, materials and products prepared from fired or sintered clay, ballast and fibre containing silica or glass.

The following examples illustrate some embodiments of the invention.

Mixtures of hydrophobic agents, surface active (wetting) agents, alcohol and water are prepared. Using such mixtures the wirecut surface of lightweight concrete blocks having a volume weight of 0.5 were treated. The lightweight concrete had a pH of about 8.

1. TEST BODIES AND METHOD OF IMPREGNATION

As test bodies there are used lightweight concrete discs having a diameter of 80 mm and a thickness of 10 mm manufactured according to the recommendations of the Swedish ER concerning diffusion testing of mortars.

Impregnation took place by quenching the test body into the surface of the liquid, absorption of impregnating liquid taking place by "capillary action".

The effect of impregnation was observed after established hydrophobicity by measuring non-wettable cross section after wetting of broken test bodies.

2. TREATING LIQUIDS

| Mixture designation according to the invention. | A | B | C |
|---|---|---|---|
| Water, ml | 1000 | 1000 | 1000 |
| Ethyl alcohol ml | 50 | 50 | 50 |
| Mixtures of alkyltrialkoxy silanes, ml | 50 | 50 | 50 |
| Surface active agent ml 1 | 0.25 | 0 | 0 |
| Surface active agent ml 2 | 0 | 0.25 | 0 |
| Mixing method 1 | Stirring. | | |
| Mixing method 2 | Mixing in high-speed Speedmix, 80,000 rev./min. | | |

3. INGREDIENTS OF MIXTURES A, B AND C

As silane there is used alkyl-trialkoxysilane under the trade name Dynasilan sold by Dynamit-Nobel of Troisdorf, West Germany.

As ethyl alcohol, industrial alcohol is used although other low molecular weight economically feasible and environmentally acceptable alcohols are suitable.

As a surface active agent I there is used surfactant having the trade mark Berol (Registered Trademark) 08 manufactured by Berol Kemi in Stenungsund, Sweden, dissolved in ethyl alcohol. The surfactant is a non-ionic surfactant based on a normal primary alcohol, is highly hydrophilic and is stated to be an alcohol-alkyleneoxy adduct.

The surfactant is not resistant towards alkalis, acids, oxidising or reducing agents.

As surfactant II there is used a surfactant having the trade name Berol 452, manufactured by Berol Kemi in Stenungsund, Sweden. The surfactant is liquid and is an anionic surfactant of the type alkylether sulphate. This surfactant is resistant towards alkalis having a pH-value up to about 13.0.

4. METHODS OF MANUFACTURE

The manufacture took place in accordance with the different methods, but no differences in characteristics and way of action of the used agent and result of treatment were noticeable.

In principle the alternatives can be selected after for example the use of the product or considering storage aspects.

Methods Used (a) Treatment of water and solvent (alcohol) and then adding surfactant. Then adding silane (possibly mixed with solvent alcohol).
(b) Mixing of silane and alcohol added to water and surfactant (and possibly alcohol).
(c) Mixing silane, alcohol and surfactant added to water (and possibly alcohol).
(d) Mixing silane and surfactant then adding to water and alcohol.
(e) The experiments were also performed after the mixtures had been stored for varying periods, the reactions described under 5, being fully or partly developed.

Different experiments with different mixtures with regard to volume proportions of the ingredients of the mixtures, namely silane, alcohol, water and surfactant ratios given in this Specification were performed—no deviations from the finding described below could be observed.

5. REACTIONS IN THE MIXTURE

Silanes hydrolyze after contact with water to form silanols, which, after condensation, form water-repellant siloxanes. Reactions may take place between the siloxanes and between the siloxanes and the treated substrate.

These reactions are fixed in time and may occur after the mixing of the liquid, during storage or during immediate treatment of a material.

6. COMPARISON BETWEEN TREATMENT ACCORDING TO THE INVENTION AND ACCORDING TO CONVENTIONAL ART

|  | Type of treatment | | |
| --- | --- | --- | --- |
|  | A | B | C |
|  |  | According to the invention |  |
| Mixability under stirring | Good | Good | Bad |
| Stability of mixture, separation after | A few days | A few hours | Immediately |
| Mixability in mixing with speedmix. | Good | Good | Good |
| Stability of mixture, separation after | Days | Weeks | A few hours. |
| Penetration depth in treatment after a contact period of 300 seconds. | 6 mm | 6 mm | 2 mm |
| Hydrophobating effect, drop test with drop 0.05 ml. the drop disappears after seconds: | More than 3,600 | 0 | |

-continued

|  | Type of treatment | | |
| --- | --- | --- | --- |
|  | A | B | C |
|  |  | According to the invention |  |
| Penetration depth when treating already hydrophobous surface t = 1 mm after a contact period of 300 sec. | 3 mm | 3 mm | 0 mm |

What I claim is:

1. A process for imparting hydrophobicity to an inorganic porous alkaline mineral substrate comprising the steps of
applying a composition comprising a dispersion or emulsion formed of alkyltrialkoxy silane or a condensation product thereof, 0.01 to 1.0% by volume of a surfactant which is decomposed by the alkalinity of the mineral substrate, and a medium wherein these components are dispersed or emulsified, selected from the group consisting of water and a water-alcohol mixture, said medium forming 75% to 90% by volume of the emulsion or dispersion, to the mineral substrate; and thereafter
allowing the surfactant to become deactivated by the alkalinity of the substrate.
2. The process of claim 1 wherein the surfactant comprises an alcohol-alkylene oxide adduct.
3. The process of claim 1 wherein the surfactant comprises an ester.

* * * * *

UNITED STATES PATENT AND TRADEMARK OFFICE
CERTIFICATE OF CORRECTION

PATENT NO. : 4,937,104
DATED : June 26, 1990
INVENTOR(S) : Josef A. Pühringer

It is certified that error appears in the above-identified patent and that said Letters Patent is hereby corrected as shown below:

Column 9, line 29, below "more than" insert --3,600 sec.--.

Signed and Sealed this

Sixth Day of October, 1992

*Attest:*

DOUGLAS B. COMER

*Attesting Officer*      *Acting Commissioner of Patents and Trademarks*